United States Patent [19]

Jones

[11] Patent Number: 4,880,970
[45] Date of Patent: Nov. 14, 1989

[54] OPTICAL SENSORS FOR MEASUREMENT OF A VARIABLE PARAMETER

[76] Inventor: Gordon R. Jones, 17 Brimstage Close, Heswall, Wirral, Merseyside, England

[21] Appl. No.: 158,668

[22] Filed: Feb. 22, 1988

[30] Foreign Application Priority Data

Feb. 26, 1987 [GB] United Kingdom ............... 8704540

[51] Int. Cl.$^4$ ..................... H01J 5/16; H01J 40/14
[52] U.S. Cl. ................................. 250/227; 250/226
[58] Field of Search ............. 250/226, 227, 231 R; 73/705; 356/405; 350/96.15, 96.16, 96.19, 96.20

[56] References Cited

U.S. PATENT DOCUMENTS 4,557,552 12/1985 Newton ..................... 350/96.15
4,727,254 2/1988 Wlodarczyk ................. 250/227

Primary Examiner—David C. Nelms
Assistant Examiner—William L. Oen
Attorney, Agent, or Firm—Anthony J. Casella; Gerald E. Hespos

[57] ABSTRACT

An optical sensor includes an optical fibre (1), a polychromatic light source (2) and a detector (3). The optical fibre is disposed such that a change in the parameter to be measured causes a movement of the fibre to vary the amount of microbending such that the portion of the polychromatic light which is no longer constrained within the fibre is varied. The detector (3) detects the intensity of the polychromatic light transmitted by the optical fibre (1) at a plurality of different wavelengths, and a microprocessor (6) interprets the output of the detector (3) in terms of the parameter to be measured.

8 Claims, 3 Drawing Sheets

OPTICAL SENSORS FOR MEASUREMENT OF A VARIABLE PARAMETER

This invention relates to optical sensors, and particularly to sensors in which the parameter to be measured influences the light transmitted along an optical fibre.

It is known that if an optical fibre is curved beyond a certain amount, then a portion of the light being transmitted therethrough will be lost through the walls of the fibre. This phenomena is known as microbending, and is regarded as a disadvantage in optical communications equipment as it results in the undesired reduction in the amplitude of optical signals.

One known type of apparatus employs microbending to form the basis for an optical pressure sensor. Monochromatic light is transmitted along an optical fibre, and the intensity of the light emerging from the far end of the fibre is monitored with a detector such as a CCD (Charge Coupled Device). A pressure on the fibre causing light to be lost through microbending, and the output signal from the CCD is accordingly reduced or even eliminated. In this way a pressure is detected and the device can be used to construct a 'pressure mat' which gives a signal whenever a load is applied thereto.

It is an object of the present invention to provide an alternative to this type of device.

Accordingly there is provided apparatus for measuring a parameter comprising a polychromatic light source; a detector; an optical fibre adapted to transmit polychromatic light from the source to the detector, the optical fibre being disposed such that a change in the parameter to be measured causes a movement of the fibre to vary the amount of microbending such that the portion of the polychromatic light which is no longer constrained within the optical fibre is varied, the detector being adapted to detect the intensity of the polychromatic light transmitted by the optical fibre at a plurality of different wavelengths; and analysis means for interpreting the output of the detector in terms of the parameter to be measured.

The apparatus according to the present invention obtains an indication of the change in colour of the light transmitted by the optical fibre, unlike the prior art device described previously which measures only the amplitude of the optical signal. On bending of the optical fibre certain wavelength components of the polychromatic light signal will escape through the walls of the fibre, whilst other wavelength components will continue to be constrained within the fibre. In this way the colour of the light transmitted by the optical fibre will be altered by microbending, in addition to its intensity.

Conveniently the detector is adapted to monitor the ratio of incident light intensities at two or more separate predetermined wavelengths. In a preferred alternative, the detector comprises at least first and second photo-responsive elements the responsivity with respect to wavelength of the first element being different from that of the second, signals from the photo-responsive elements being fed to the analysis means which calculates, from the signals from the photo-responsive elements, the colour of the polychromatic light transmitted by the optical fibre as represented by two or more parameters on the Chromaticity (CIE) Diagram. In one convenient arrangement two different photo-responsive elements are employed, each with its own wavelength responsivity characteristic. Alternatively, one or both of the photo-responsive elements includes a coloured filter to impart a colour response characteristic, thereby allowing two identical photo-responsive elements to be employed, if desired. Preferably the responsivity with respect to wavelength/intensity curves overlap for at least a part of the wavelength spectrum.

By employing at least first and second photo-responsive elements, a change of colour is determined by assessing the change in the whole of a selected part of the spectrum (colour modulation) as opposed to merely detecting the change at two or more selected wavelengths (wavelength modulation). Thus a change from colour A (represented by wavelength/intensity curve A) to colour B (represented by wavelength/intensity curve B) will be calculated from the area between the two curves, thereby giving a more complete analysis of 'true' colour. Wavelength modulation is less sophisticated in that it is a calculation based on the distance between the curves at two or more selected wavelengths.

By the term 'polychromatic light' there is herein meant any multi-wavelength radiation, and is specifically meant to include both visible light and infra red radiation. The term 'colour', whilst used herein for ease of understanding, should in no way imply that only visible light may be employed. Where the apparatus employs a source emitting radiation outside of the visible spectrum, the term 'colour' will refer to the spectral distribution of the radiation.

Conveniently there is provided a member against which at least a portion of the optical fibre is urged by a change in the parameter to be measured. In one arrangement the member is a longitudinally extending anvil adjacent which the optical fibre is disposed. The anvil conceivably has an uneven surface in order to promote microbending when the fibre is urged into contact therewith.

The optical fibre conveniently comprises a first portion extending along the anvil in a first longitudinal direction, and a second portion returning along the anvil in the opposite longitudinal direction. Conceivably the first and second portions of the optical fibres are stranded one with the other. Alternatively the optical fibre is wound helically on the longitudinally extending anvil. According to one convenient arrangement the anvil is in the form of a cylinder.

Conveniently there is provided means for colour modulating the portion of the polychromatic light which is no longer constrained within the optical fibre, and means for returning the colour modulated light into the optical fibre. This will serve to maintain the polychromatic light signal at an acceptably high amplitude whilst ensuring that the colour signature of the light is still altered by the microbending. Conveniently the colour modulation means comprises a coloured filter adjacent the optical fibre, and the return means comprises a reflective surface provided on a face of the filter remote from the optical fibre. The coloured filter is conveniently formed as a sleeve surrounding the optical fibre.

The invention further resides in a method of measuring a parameter employing apparatus as hereinbefore described. In particular a method of measuring a parameter comprises the steps of passing polychromatic light along an optical fibre, disposing the fibre such that a change in the parameter to be measured causes a movement of the fibre to vary the amount of microbending such that the portion of the polychromatic light which is no longer constrained within the optical fibre is varied, detecting the intensity of the polychromatic light transmitted by the optical fibre at a plurality of different wavelengths, and interpreting the detected intensity of the polychromatic light in terms of the parameter to be measured.

The method conveniently includes the step of monitoring the ratio of detected light intensities at two or more separate wavelengths. Alternatively the method includes the step of detecting the transmitted polychromatic light with a detector comprising at least first and second photo-responsive elements, the responsivity with respect to wavelength of the first element being different from that of the second; calculating, from the output of the first and second photo-responsive elements, the colour of the polychromatic light transmitted by the optical fibre as represented by two or more parameters on the Chromaticity (CIE) Diagram; and interpreting the colour of the transmitted polychromatic light in terms of the parameter to be measured.

The invention will now be further described, by way of example only, with reference to the accompanying drawings, in which.

Figure 1:
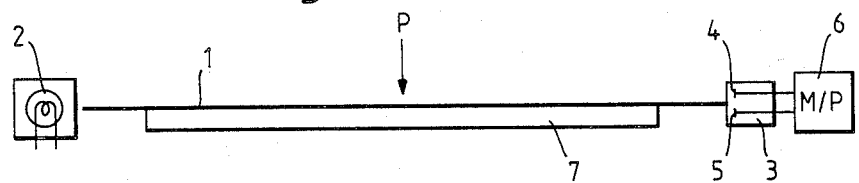
FIG. 1 is a schematic diagram of a pressure sensor according to the invention.

Referring to FIG. 1 there is shown a pressure sensor comprising an optical fibre 1 transmitting polychromatic light from a source 2 to a detector 3. The detector comprises two photo-responsive elements 4 and 5, signals from which are passed to a microprocessor 6 for analysis. The optical fibre 1 rests on an anvil 7 the upper surface of which is covered with an uneven material such as sandpaper. When a pressure P is applied to the fibre 1, the uneven surface helps to promote microbending, as illustrated further with reference to FIG. 2.

Figure 2:
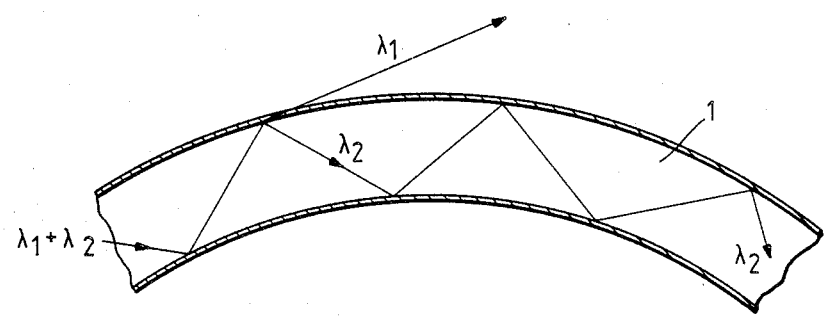
FIG. 2 is a diagram showing microbending in an optical fibre.

The pressure P causes the optical fibre 1 to be forced into a curve as shown in FIG. 2. Polychromatic light containing at least wavelength components $\lambda_1$ and $\lambda_2$ is constrained within the optical fibre, until such time as the curvature of the fibre reaches a critical angle, at which point wavelength components $\lambda_1$ is allowed to pass through a wall of the fibre. Wavelength component $\lambda_2$ continues to be reflected along the optical fibre 1 but wavelength $\lambda_1$ is lost, thereby causing a colour change in the light transmitted thereby.

The light transmitted by the fibre 1 impinges on the photo-responsive elements 4 and 5 producing two different output signals, which signals are analysed by the microprocessor 6. The microprocessor 6 calculates the colour of the transmitted light in terms of two parameters on the Chromaticity (CIE) Diagram from the signals from the photo-responsive elements 4 and 5. The microprocessor, on detecting a change in colour, may give an indication that a pressure P has been detected, for example on a display unit (not shown). Additionally, where it is desired to calculate the strength of the pressure P, the parameters are compared with those in a look-up table stored in a read only memory of the microprocessor, and the corresponding value of pressure is obtained. The magnitude of the pressure may then be displayed on the display unit.

Figure 3:
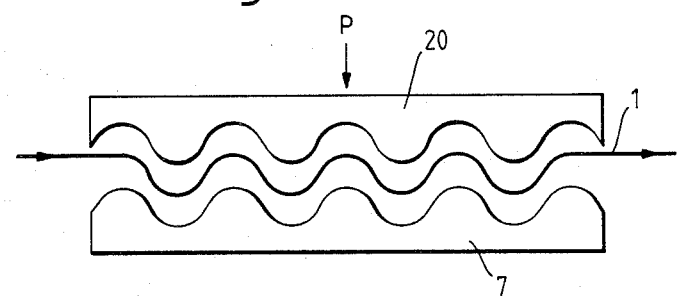
FIG. 3 is a schematic diagram of a part of an alternative embodiment of pressure sensor according to the invention.

FIG. 3 shows an arrangement in which the promotion of microbending is facilitated by anvils both above and below the optical fibre 1. In addition to the anvil 7 below the fibre, a complementary anvil 20 located above the fibre transfers the pressure P thereto. The pressure P causes the anvil 20 to move or flex, trapping the fibre 1 against the anvil 7 to cause an increase in the occurrence of microbending.

Figure 4:
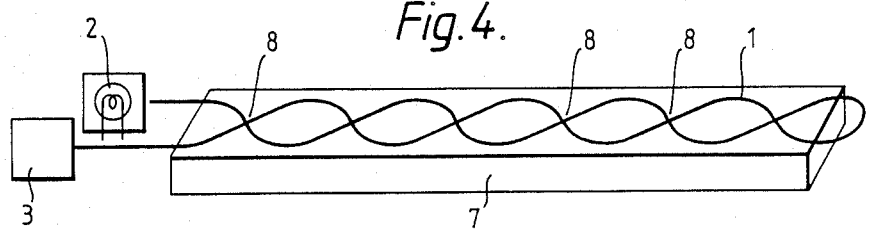
FIG. 4 is a schematic diagram of an alternative embodiment of a pressure sensor according to the invention.

FIG. 4 shows a variation on the apparatus of FIG. 1, in which the optical fibre 1 is looped back on itself such that the source 2 and detector 3 are situated on the same side of the anvil 7. The outward and return halves of the fibre 1 are stranded together such that cross-over points 8 are produced, further promoting the occurrence of microbending.

Figure 5:
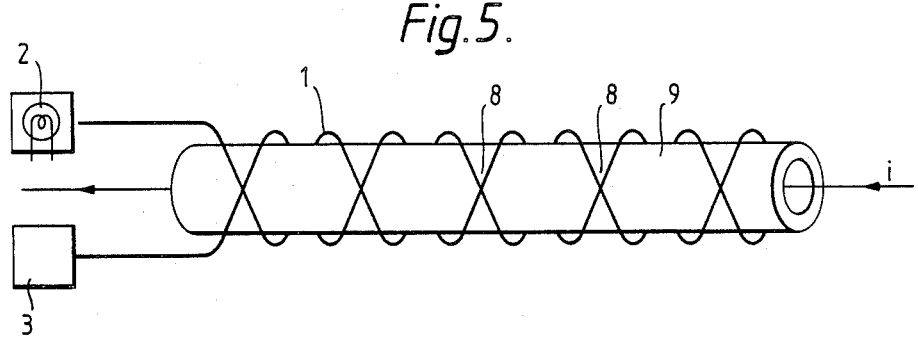
FIG. 5 is a schematic diagram of another alternative embodiment of apparatus according to the invention.

FIG. 5 shows a sensor in which the anvil is in the form of a cylinder 9 on which the optical fibre 1 is helically wound. The cylinder may be formed of material such as copper which has a relatively high thermal expansion coefficient. An increase in the temperature of the cylinder 9 causes it to expand exerting a corresponding pressure on the optical fibre 1, especially at the cross-over points 8. In this way a change in temperature is converted by microbending into a change in colour which is detected by the detector 3.

The apparatus of FIG. 5 may be adapted to measure the current flowing along a wire 20. In this instance the cylinder is hollow and the current carrying wire passes therethrough. The cylinder is formed of a ferromagnetic material such that the cylinder expands and contracts depending on the strength of the magnetic field produced by the current flowing in the wire 20. As before, any expansion exerts a pressure on the optical fibre 1 causing microbending, which is detected as a change in colour by the detector 3. A similar effect may be obtained by employing a piezoelectric material, which expands and contracts due to the voltage induced from the wire 20.

Figure 6:
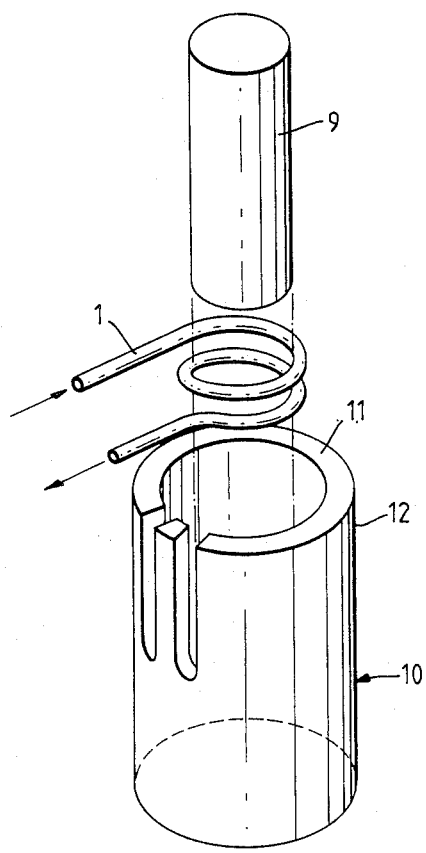
FIG. 6 is an exploded diagram of yet another alternative embodiment of apparatus according to the invention.
Figure 7:
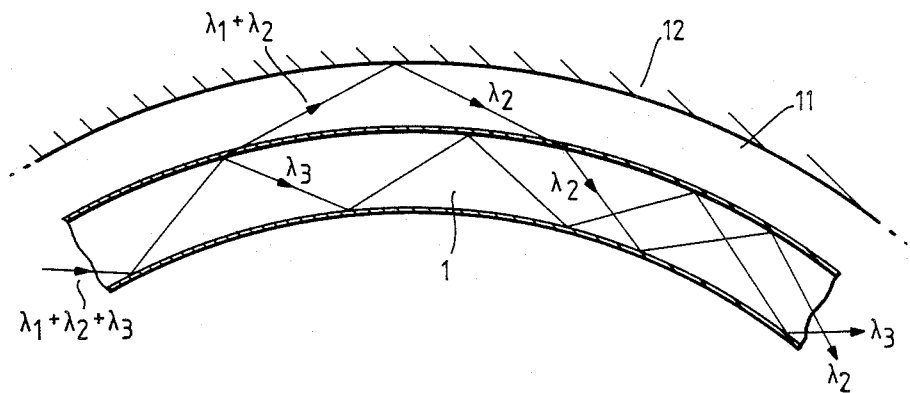
FIG. 7 is a schematic diagram of a part of the apparatus of FIG. 5.

The sensor of FIG. 6 comprises a cylindrical anvil 9 about which is wound optical fibre 1. The anvil and fibre are surrounded by a sleeve 10 comprising a coloured glass filter 11, the outside surface of which is silvered to form a reflective surface 12. On expansion of the cylinder 9, microbending causes certain wavelength components of the light to escape from the fibre 1 into the sleeve 10, as can be seen in more detail in FIG. 7. Due to microbending, wavelength components $\lambda_1$ and $\lambda_2$ escape from the optical fibre 1, whilst wavelength $\lambda_3$ continues to be reflected therein. Wavelength component $\lambda_2$ travels across the filter, is reflected by the silvered surface 12, and passes back into the fibre 1. The absorption characteristics of the filter 11 are however such that the wavelength component $\lambda_1$ is attenuated. Thus the light continuing along the fibre consists of wavelengths $\lambda_2$ and $\lambda_3$, but the colour has been changed by the absorption of wavelength $\lambda_1$. In this way a colour signature is imparted to the polychromatic light, and the reduction in the amplitude of the signal strength is alleviated.

Figure 8:
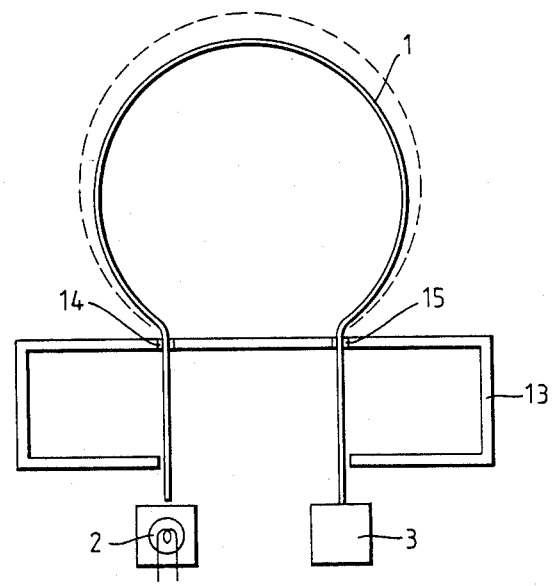
FIG. 8 is a schematic diagram of a temperature sensor according to the invention.

FIG. 8 shows a temperature sensor in which the optical fibre 1 is formed into a loop and clamped to a frame 13 at locations 14 and 15. An increase in the temperature causes the fibre to expand, and as the length of the fibre is increased, the radius of the loop also changes. This change in the radius of the loop varies the amount of microbending and causes a corresponding colour change in the light transmitted by the fibre 1, which colour change is detected by the detector 3.

Other arrangements in which microbending is induced in an optical fibre in response to a change in a parameter will be apparent to those skilled in the art. Any parameter capable of being translated into a microbend colour change can be measured by the technique of the present invention.

I claim:

1. Apparatus for measuring a parameter comprising a polychromatic light source; a detector; an optical fibre situated so as to transmit polychromatic light from the source to the detector, the optical fibre being disposed such that a change in the parameter to be measured causes a movement of the fibre to vary the amount of microbending such that the portion of the polychromatic light which is no longer constrained within the optical fibre is varied, there being provided a member against which at least a portion of the optical fibre is urged by a change in the parameter to be measured; and analysis means for interpreting the output of the detector in terms of the parameter to be measured, the detector comprising at least first and second photo-responsive elements, the responsivity with respect to wavelength of the first element being different from that of the second, and means for supplying signals from the photo-responsive elements to the analysis means, the analysis means including means for calculating, from the signals from the phot-responsive elements, the color of the polychromatic light transmitted by the optical fibre as represented by two or more parameters on the Chromaticity (CIE) Diagram.

2. Apparatus according to claim 1 wherein the member is a longitudinally extending anvil adjacent which the optical fibre is disposed.

3. Apparatus according to claim 2 wherein the optical fibre is wound helically on the longitudinally extending anvil.

4. A method of measuring a parameter comprising the steps of passing polychromatic light along an optical fibre, disposing the fibre such that a change in the parameter to be measured causes a movement of the fibre to vary the amount of microbending such that the portion of the polychromatic light which is no longer constrained within the optical fibre is varied, detecting the transmitted polychromatic light with a detector comprising at least first and second photo-responsive elements, the responsivity with respect to wavelength of the first element being different from that of the second; calculating, from the output of the first and second photo-responsive elements, the color of the transmitted polychromatic light as represented by two or more parameters on the Chromaticity (CIE) Diagram and interpreting the color of the transmitted polychromatic light in terms of the parameter to be measured.

5. Apparatus for measuring a parameter comprising:
 (a) a polychromatic light source;
 (b) a detector;
 (c) an optical fibre situated so as to transmit polychromatic light from the source to the detector;
 (d) the optical fibre being disposed such that a change in the parameter to be measured causes a movement of the fibre to vary the amount of microbending such that the portion of the polychromatic light which is no longer constrained within the optical fibre is varied; and
 (e) analysis means for interpreting the output of the detector in terms of the parameter to be measured;
 the detector comprising:
 (f) at least first and second photo-responsive elements, the responsivity with respect to wavelength of the first element being different from that of the second, and
 (g) means for supplying signals from the photo-responsive elements to said analysis means;
 the analysis means including:
 (h) means for calculating, from the signals from the photo-responsive elements, the color of the polychromatic light transmitted by the optical fibre as represented by two or more parameters on the Chromaticity (CIE) Diagram.

6. Apparatus for measuring a parameter comprising a polychromatic light source; a detector; an optical fibre situated so as to transmit polychromatic light from the source to the detector, the optical fibre being disposed such that a change in the parameter to be measured causes a movement of the fibre to vary the amount of microbending such that the portion of the polychromatic light which is no longer constrained within the optical fibre is varied, and analysis means for interpreting the output of the detector in terms of the parameter to be measured, the detector comprising at least first and second photo-responsive elements, the responsivity with respect to wavelength of the first element being different from that of the second, means for supplying signals from the photo-responsive elements to the analysis means, the analysis means including means for calculating, from the signals from the photo-responsive elements, the color of the polychromatic light transmitted by the optical fibre as represented by two or more parameters on the Chromaticity (CIE) Diagram, and further including means for color modulating the portion of the polychromatic light which is no longer constrained within the optical fibre, and means for returning the color modulated light into the optical fibre.

7. Apparatus according to claim 6 wherein the colour modulation means comprises a coloured filter adjacent the optical fibre, and the return means comprises a reflective surface provided on the face of the filter remote from the optical fibre.

8. Apparatus according to claim 7 wherein the coloured filter is formed as a sleeve surrounding the optical fibre.

* * * * *